United States Patent [19]

De Blauwe

[11] 4,450,023

[45] May 22, 1984

[54] THERMOCHROMIC COMPOSITION

[75] Inventor: Francis J. A. M. C. De Blauwe, Lubbeek, Belgium

[73] Assignee: N.V. Raychem S.A., Kessel, Belgium

[21] Appl. No.: 273,179

[22] Filed: Jun. 12, 1981

[51] Int. Cl.³ .................. B32B 31/00; C09K 3/00; G01K 11/12

[52] U.S. Cl. .................. 156/64; 116/201; 116/207; 156/86; 174/DIG. 8; 252/408.1; 374/162; 428/36; 428/913

[58] Field of Search .............. 252/408.1; 374/162; 174/DIG. 8; 156/64, 86; 116/201, 207; 428/36, 913

[56] References Cited

U.S. PATENT DOCUMENTS

| | | | |
|---|---|---|---|
| 2,027,962 | 1/1936 | Currie | 264/230 |
| 3,086,242 | 4/1963 | Cook et al. | 264/566 |
| 3,379,218 | 4/1968 | Conde | 174/DIG. 11 |
| 3,627,469 | 12/1971 | Cheng | 252/408 |
| 3,816,335 | 6/1974 | Evans | 252/583 |
| 3,957,382 | 5/1976 | Grevel, Jr. et al. | 156/86 |
| 4,137,769 | 2/1979 | Parker | 73/356 |
| 4,138,357 | 2/1979 | Igarashi | 73/356 |
| 4,151,748 | 5/1979 | Baum | 252/408 |
| 4,206,786 | 6/1980 | Wetmore | 428/913 |
| 4,228,761 | 10/1980 | Glover et al. | 252/408 |
| 4,344,909 | 8/1982 | De Blauwe | 264/230 |

FOREIGN PATENT DOCUMENTS 880838 1/1980 Belgium .
1488553 10/1977 United Kingdom .

Primary Examiner—William R. Dixon, Jr.
Attorney, Agent, or Firm—Edith A. Rice; T. Gene Dillahunty; Herbert G. Burkard

[57] ABSTRACT

A thermochromic composition suitable for coating heat-recoverable materials for cable enclosures. The composition contains an organic material which melts and decomposes at a certain temperature by trapping the decomposition products in the composition.

18 Claims, No Drawings

THERMOCHROMIC COMPOSITION

This invention relates to thermochromic compositions and more especially to such compositions in the form of coating compositions, such as paints, and markers such as crayons.

Thermochromic materials are those which change colour on being heated to a typical, usually well-defined, temperature. The change in colour is frequently reversible and associated with a reversible chemical change which occurs at that temperature.

Typically thermochromic materials are used as warning indicators that a certain maximum safety temperature has been reached or as means whereby a subsequent check will reveal that some critical temperature was attained; they have also found use in desk thermometers where different materials indicate different temperatures.

One especially interesting application of thermochromic materials has been in the field of heat-recoverable articles such as the heat-shrinkable polymeric sleeves described and claimed in U.S. Pat. Nos. 2,027,962 and 3,086,242 and the heat-shrinkable wraparound sleeves described and claimed in U.S. Pat. No. 3,379,218 and British Pat. Nos. 1,155,470; 1,211,988 and 1,345,479. The disclosures of these patents, and of other patents and applications referred to hereafter are incorporated herein by reference. Another type of heat-recoverable article is described in British Pat. No. 1,440,524 in which an elastomer member such as an outer tubular member is "held out" in a stretched state by a second member, such as an inner tubular member, which upon heating weakens and thus allows the elastomeric member to recover.

These heat-recoverable articles are typically provided with a sealant coating, for example on the inner surface of a heat-shrinkable sleeve, so that a seal is made between the sleeve and a substrate such as a pipe or cable when the sleeve shrinks around it. The sealants are usually mastics or hot-melt adhesives, for example those described and claimed in British Pat. No. 1,440,810 and German OS No. 2,723,116. In such cases, heat is required both to shrink the expanded plastics material and to melt the sealant. The heating means is often simply a torch which may degrade the plastic if it becomes too hot and yet, on the other hand, it is important that sufficient heat is applied to cause the sealant to melt and flow when in contact with the substrate. It has been proposed therefore in, for example, U.S. Pat. No. 3,816,335 and British Pat. No. 1,511,053, to use a suitable thermochromic paint on the surface of the heat-recoverable article in order to monitor and control the heat during recovery.

The use of these materials has been successful but most of those so far proposed have been inorganic in nature, which may occasionally be environmentally undesirable, and they tend to revert to their original colour on cooling. This has caused some problems in applications where a check is made some time after recovery to ensure that the heat-recoverable device was heated to the correct temperature. A further problem has been that the original (i.e. low temperature) colour of the inorganic thermochromic substance has clashed with design and/or coding requirements.

U.S. Pat. No. 4,344,909 provides a heat-recoverable article which is to be heated to a pre-selected temperature during installation or use, which carries an improved temperature indicating composition based on surprisingly simple and inexpensive organic materials which decompose at or about their melting point. As will be explained in more detail hereinafter the materials are, in some respects, not classically "thermochromic" insofar as the colour change is generally irreversible. However, for convenience, they will hereinafter be referred to as thermochromic materials.

These improved organic temperature-indicating compositions nevertheless suffer from an apparent colour reversibility problem, owing to the leaching out of the decomposition products of the thermochromic material from the binder on prolonged contact with moisture, such as may occur in use of the heat-recoverable articles on underground cables, thus leaving behind empty bubbles or shells of the binder. In the preferred thermochromic composition of U.S. Pat. No. 4,344,909 a dye is incorporated in the binder and the empty shells or bubbles thus present to the eye a colour which may be very difficult to distinguish from the original (undecomposed) colour of the temperature-indicating composition, and this is clearly undesirable, as it makes it difficult or impossible to determine whether or not the heat-recoverable article was correctly heated at the time of installation.

The present invention relates to an ingenious and elegant solution to this problem, and accordingly provides a heat-recoverable article having on a surface thereof a thermochromic composition comprising at least one organic binder and at least one organic material responsible for a visible colour transformation when the article is heated to at least its recovery temperature, wherein the binder interacts with transformed organic material to inhibit leaching thereof from the composition.

The invention also provides an article carrying a meltable sealant (which includes hot-melts and mastics) and the thermochromic composition defined above.

The invention further provides the thermochromic composition itself.

The transformation of the organic material is preferably an irreversible decomposition which follows melting of the material, although an irreversible change in the physical state of chemical environment of the material can be sufficient. Whether such a transformation has occurred can be tested by mixing the material and a binder, and heating. The product is then cooled and if desired washed with water or other solvent; if no recrystallisation of the product occurs, and no leaching occurs, a successful transformation can be regarded as having taken place.

Without being limited to any theory, we believe the interaction between the binder and the transformed organic material prevents leaching of the material or its decomposition products that would otherwise result in colour reversion. The interaction will generally be a chemical reaction, rather than, say, absorption, but other forms of chemical or physical bonding can occur to fix the material or decomposition products. By fixing we simply mean that the decomposition products are held in the composition such that leaching, by water for example, is prevented or reduced.

The primary function of the binder is to fix the thermochromic material and any other dye to the substrate. The colour change may result simply from the organic material being a different colour from its decomposition product, in which case the composition will initially have the colour of the organic material and finally have the colour of its decomposition product, although a pigment could be added which modifies both colours. It is preferred however that the colour change is a more complicated affair, the decomposition of the organic material affecting the light reflecting properties of the composition. In this case, the colour change need not correspond to a colour change (if any) in the organic material, but will result from a change in the extent of masking of a pigment or dye within the composition. In order for such a pigment or dye to develop any colour, it is necessary for some component to be present that scatters or reflects light; usually the organic material has this function, although the binder may contribute as well. Before heating, the organic material will preferably be in a white crystalline state which reflects light, giving the material the colour of the pigment or dye. On heating, the organic material melts, becoming finally a black product. The thermochromic composition will now absorb light and the appearance will become black. The colour change will therefore be from the colour of the pigment or dye to black. On a microscopic scale, the organic material may be regarded as overlying a black substrate, and itself be covered with, say, a film of green pigment plus the binder which fixes it to the substrate. Before heating, the organic material would be white and the overall colour would be green. After heating, the organic material decomposes and becomes black, so incident light passes through the green pigment and what is not absorbed by the pigment is absorbed by the underlying black decomposition products, and no light is reflected. The colour change is therefore green to black. If, however, the decomposition products were leached away, voids would be left in the thermochromic composition surrounded by the film of pigment plus binder. Incident light would enter the void at one site being scattered by the binder and leave at a different site; the colour of the emerging light being substantially the same as the pigment. Hence no colour change would be noted. It is not possible to avoid the problem by omitting the binder, since this component is required to fix the thermochromic material and dye to the substrate. What this invention does is to trap the decomposition products of the thermochromic material in the voids, by interaction with the binder.

The thermochromic composition can be made up into any physical form desired. It may, for instance, be provided as a water-based paint, an organic paint, as water-based crayon, or as a spray. A preferred form is an organic based paint having a volatile, non-toxic non-inflammable solvent to ensure quick, safe drying. The amount of the thermochromic ingredient in the composition is preferably 1–20% by weight. The amount of binder can also be varied to achieve best results; too much binder reduces the hiding power of the thermochromic ingredient, and too little binder results in poor adhesion of the colouring agent to the substrate.

A form of heat-recoverable article to which the thermochromic composition is advantageously applied is one capable of forming an enclosure about a body and carries on a surface which will face the interior of the enclosure a meltable composition. The thermochromic composition is carried on a surface which will be visible when the article is enclosing the body, and is formulated to produce the colour change when heated to a temperature which results in the melting of the said meltable composition to effect sealing of the enclosure. This will determine to a certain extent the choice of the organic thermochromic material. Mixtures of decomposable organics may, of course, be used according to end result requirements, and it will be understood that not all of the decomposable materials need be capable of reacting with the binder. A list of decomposable materials including the currently preferred allantoin and ascorbic acid is given in U.S. Pat. No. 4,344,909. As illustrated in the foregoing Examples, the thermochromic composition is preferably coloured by means of a pigment or dyestuff in addition to the decomposable organic material. The articles of the present invention may be provided as a kit of parts for use in providing a sleeve enclosure around an elongate body, e.g. a cable splice.

Suitable pairs of binders and decomposable organic materials having the necessary interaction at the decomposition temperature can readily be selected by suitably skilled persons, armed with the information in this specification. It is preferred to use an acid polymer as the binder, especially a polymer including acrylic acid units, and preferred decomposable organic materials are those which produce an organic base upon decomposition, particularly those containing amide linkages. However, these are not the only suitable materials, and the following considerations will generally be taken into account in chosing pairs of materials.

What we have discovered is that some sort of interaction, generally a chemical bond although weaker chemical or physical interaction can be sufficient, between the binder and the decomposition products of the thermochromic indicator can localize these products and provide the desired nonreversibility. The skilled man, having chosen a suitable thermochromic indicator, according to desired colour change and transition temperature, must then select a binder which is compatible. The important characteristics of a binder include its functionality, number of functional groups, its chain mobility, its molecular weight and its light scattering. In the case of acid functionality, an acid number of 50–90 will be satisfactory and examples in the Carboset range are: Carboset XL27, 80; Carboset 525, 76–85; and Carboset 515, 60–65. Carboset is a Trademark of B. F. Goodrich Chemical Company for acrylic acid polymers. A molecular weight range of 1000–50,000 is generally suitable but 1000–25,000 is preferred. With knowledge of the decomposition products of any particular indicator one can choose a binder having the right functionality. Then it is necessary for one to select a binder of the chosen series having a sufficiently low molecular weight; for the lower the molecular weight the more available are the functional groups of the binder for interaction with the decomposition products. The ratio between the amount of thermochromic material and the amount of binder is also important. Again, one should ensure that there is a sufficient number of binder functional groups to localise the decomposition products.

A wide variety of binders and thermochromic materials can be used, but the invention is primarily discussed with reference to the indicators allantoin, alanine and ascorbic acid shown in Table 1 and to a series of binders shown in Table 2. The weight ratio between thermochromic and binder is preferably from 8:1 to 3:1, more preferably about 4:1. The indicators have different colour changes, transition temperatures and produce different types of decomposition products; and the binders listed have various functionality and various molecular weights. One factor which will affect the choice of indicator and binder is the rate of reaction between them at the desired transition temperature, it being desirable that the colour change occurs in one minute or less at, say, a temperature of 200° C. or more.

TABLE 1

| Thermochromic Indicator | Colour Decomposition | Decomposition Temperature |
|---|---|---|
| Allantoin | White-Black | 234° C. |
| Ascorbic Acid | White to Black | 190-194° C. |
| D,L-alanine | White to Black | 285° C. |

TABLE 2

| Trade Name of Binder | Basic Composition | Functionality | Molecular Weight |
|---|---|---|---|
| Elvax 4310 | Ethylene vinyl acetate | Acid | 30000-50000 |
| Elvax 310 | Ethylene vinyl acetate | Non acid Groups | Low |
| AC 5120 | Polyethylene | Methacrylic Acid | Low |
| Carboset 515 | Acrylic Resin | Acid | = 7000 |
| Carboset xL27 | " | " | = 30,000 |
| Carboset 525 | " | " | 200000-260000 |
| Versamid 100 | Liquid Polyamide | Amine | Low |
| Paraloid B66 | Acrylic Resin | Non-functional | |

From the type of information given in this table, and with a knowledge of the characteristics of binders required to give non-reversibility, the skilled man could choose a suitable binder for whichever material he had selected.

In addition to the binder and the thermochromic material, the thermochromic composition can contain many other components. For example a pigment such as an organic dye (see above), e.g. cinquasia green, sunfast blue or sumatra yellow may be added for colouring purposes. The preferred weight ratio of thermochromic material to extra dye is from 100:1 to 300:1, about 250:1 being preferred. In general, the recoverable article to be coated with the thermochromic composition will be black, and it may be desirable that the composition contains a pigment in order that a thermochromic material whose final colour is black may be used more effectively. If, say, a green dye is used with a material such as allantoin (which changes from white to black), the pre-heating colour of the coated article will be green and the final colour will be black. One can see, therefore, that for colour irreversibility it is necessary that the decomposition products of the allantoin do not leach away since this would cause colour reversal to green. A likely mechanism was explained above. Thickening agents, e.g. fumed silica (e.g. Cab-O-Sil and Aerosol) may be added to improve the rheological properties. In this respect, organic thickening agents with low melting points are especially preferred because they do not interfere with the colour change.

One such organic thickening agent is Thixatrol ST which is derivative of castor oil sold by National Lead which may be used at levels of 0.5% by weight and higher, especially 1% and more, in the above described formulation.

Antioxidants, such as Irganox 1010 and Plastinox 1212, and plasticizers such as dioctyl phthalate may also advantageously be incorporated.

Mixtures of the decomposable materials may be used to produce gradual colour change as a signal to the operator that the desired temperature is being approached, and in such cases it is preferred to use about 9 parts of a material having a higher decomposition temperature to one part of material(s) having a lower decomposition temperature. For example nine parts of allantoin to one part of ascorbic acid could be used.

The following Examples and comparative Examples give the results of combining the indicators mentioned above with the binders mentioned above.

EXAMPLE 1

A thermochromic composition was prepared based on ELVAX 4310 and allantoin. The following components were mixed using routine equipment and procedures.

| COMPONENT | PARTS BY WEIGHT |
|---|---|
| Elvax 4310 (Binder) | 4 |
| Allantoin (Thermochromic indicator) | 16 |
| Sunfast blue or cinquasia green (extra pigment) | 0.06 |
| Irganox 1010 (a hindered phenolic stabilizer) | 0.25 |
| Plastinox 1212 (a sulfur containing stabilizer) | 0.25 |
| Dioctylphthalate (Plasticizer) | 0.50 |
| Methanol/$H_2O$ (smoothing agent) | 0.25 |
| Thixatrol ST (a caster oil based rheological additive) | 1.00 |
| Organic solvent | 78 |

Heat-recoverable wraparound sleeves of the kind generally described in British Pat. No. 1,155,470 were coated with this thermochromic paint formulation and were installed around a cable splice with heating to a temperature which caused the thermochromic paint to undergo the aforementioned colour change. The installed sleeves were then immersed in water at 40° C. for six days, after which time there was no evidence of reversion to the original (pre-installation) colour of the thermochromic paint.

EXAMPLES 2-5

The procedure of Example 1 was substantially followed, except that other thermochromic indicators and binders, were used.

TABLE 3

| Example | Thermochromic Indicator | Binder |
|---|---|---|
| 2 | Allantoin | AC 5120 |
| 3 | " | Carboset 515 |
| 4 | " | Carbosets 515 + XL27 (in 8:1 ratio) |
| 5 | Ascorbic Acid | Carboset 515 |

In all these cases, the colour change was found to be irreversible over the time period tested.

COMPARATIVE EXAMPLES

Example 1 was repeated, except that the binders used were ones which did not contain a sufficient number of free groups of the right functionality for the thermochromic indicator concerned.

Three of the binders that were used were substantially non-acidic binders, namely Paraloid B66, Elvax 310, and Versamid 100. These binders would not be expected to react in the case of thermochromic indicators whose decomposition products were organic bases. Also used were higher molecular weight versions of the binders that were successful in Examples 1–8.

TABLE 4

| Comparative Example | Thermochromic Indicator | Binder |
|---|---|---|
| 1 | Allantoin | Versamid 100 |
| 2 | " | Elvax 310 |
| 3 | " | Elvax 4310 + Paraloid B66 |
| 4 | " | Carboset XL27 |
| 5 | " | Carboset 525 |
| 6 | " | Paraloid B66 |
| 7 | Oxamide | Paraloid B66 |
| 8 | " | Elvax 310 |
| 9 | " | Versamid 100 |
| 10 | " | Carboset XL27 |
| 11 | Ascorbic Acid | Paraloid B66 |
| 12 | " | Carboset 515+ Paraloid B66 (4:1) |
| 13 | " | Carboset XL27 |

In each of these cases the thermochromic paint reverted to its pre-installation colour after immersion in water at 40° C. for 6 days under the condition of the tests.

It thus appears that interaction between the reactive units of the binders and the decomposable organic materials in Examples 1–5 must be responsible for the retention of the colour change in those Examples.

The preferred interaction is a reaction between acrylic acid binder units and organic bases from the indicators; the invention is not limited to this particular mechanism, but includes the use of temperature indicating compositions comprising binders and decomposable organic materials whatever their type of interaction.

I claim:

1. A heat recoverable article which is to be heated to a pre-selected temperature during installation or use having on a surface thereof a thermochromic composition comprising at least one organic binder and at least one organic material which undergoes a transformation when the article is heated to said pre-selected temperature, to produce a visible color change; said binder interacting with the transformed organic material to inhibit leaching thereof from the composition; whereby a substantially non-reversible color change of said composition takes place when said article is heated to said preselected temperature.

2. A heat recoverable article having on one surface thereof a meltable sealant, and on another surface thereof a thermochromic composition comprising at least one organic binder and at least one organic material which undergoes a transformation to produce a visible color change when the sealant is heated to at least its melting or softening temperature, said binder interacting with the transformed organic material to inhibit leaching thereof from the composition; whereby a substantially non-reversible color change of said composition takes place when said article is heated sufficiently to cause said sealant to melt or soften.

3. An article according to claim 1 or 2, wherein the organic material melts and decomposes and the binder reacts with at least one decomposition product of the organic material to fix the decomposition product in the composition.

4. An article according to claim 1 or 2, capable of forming an enclosure about a body, having a meltable sealant on the surface which will face the interior of the enclosure, and the thermochromic composition on the surface which will be visible when the article is enclosing the body.

5. An article according to claim 1 or 2, wherein the binder has acid functionality.

6. An article according to claim 5, wherein the acid polymer includes reactive acrylic or methacrylic acid units.

7. An article according to claim 6, wherein the acidic polymer is an ethylene/vinyl acetate/acrylic acid terpolymer.

8. An article according to claim 1 or 2, wherein the said organic material produces an organic base upon decomposition.

9. An article according to claim 1 or 2, wherein the said organic material contains at least one amide group or linkage.

10. An article according to claim 1 or 2, wherein the said organic material comprises allantoin, ascorbic acid, or alanine.

11. An article according to claim 1 or 2, wherein the thermochromic composition comprises a mixture of decomposable organic materials which melt and decompose at temperatures sufficiently different from one another that the colour change of the composition is gradual.

12. An article according to claim 1 or 2, wherein the thermochromic composition includes a pigment or dyestuff in addition to the organic material which interacts with the binder.

13. An article according to claim 12, wherein the contribution of the pigment or dyestuff to the colour of the composition is altered by decomposition of the organic material.

14. An article according to claim 12, wherein the binder fixes the pigment or dyestuff to the article in addition to fixing the decomposition product.

15. An article according to claim 12, wherein the organic material reflects or scatters light of the colour of the pigment or dyestuff, and the decomposition product absorbs light of that colour.

16. An article according to claim 1 or 2, which has been subjected to a temperature such that the thermochromic composition has undergone the visible colour change.

17. A method of enclosing a body, comprising positioning around the body a heat-recoverable article according to claim 4, and heating the article so as to recover it about the said body or so as to cause said sealant to melt or to soften, and to cause the thermochromic composition to undergo the visible colour change.

18. A thermochromic composition capable of adhering to a surface of a heat recoverable article which is to be heated to a pre-selected temperature during installation or use, said composition comprising at least one organic binder and at least one organic material which undergoes a transformation when the article is heated to said pre-selected temperature to produce a visible color change; said binder interacting with the transformed organic material to inhibit leaching thereof from the composition.

* * * * *